(12) United States Patent
Abbas et al.

(10) Patent No.: US 6,577,594 B1
(45) Date of Patent: Jun. 10, 2003

(54) TELECOMMUNICATIONS SYSTEM

(75) Inventors: Ghani A Abbas, Wollaton (GB); Bernard J Goatly, Kimberley (GB); Stephen T Chapman, Long Eaton (GB)

(73) Assignee: Marconi Communications Limited, Coventry (GB)

( * ) Notice: Subject to any disclaimer, the term of this patent is extended or adjusted under 35 U.S.C. 154(b) by 0 days.

(21) Appl. No.: 09/327,371

(22) Filed: Jun. 4, 1999

(30) Foreign Application Priority Data

Jun. 9, 1998 (GB) .............................................. 9812281

(51) Int. Cl.⁷ .......................................... H04L 12/437
(52) U.S. Cl. ...................................... 370/222; 370/216
(58) Field of Search .............................. 370/217, 227, 370/228, 225, 224, 222, 216

(56) References Cited

U.S. PATENT DOCUMENTS

| | | | | |
|---|---|---|---|---|
| 5,007,052 A | * | 4/1991 | Flammer | |
| 5,056,085 A | * | 10/1991 | Vu | |
| 5,457,689 A | * | 10/1995 | Marvit et al. | |
| 5,737,310 A | * | 4/1998 | Goto | 370/222 |
| 5,757,768 A | * | 5/1998 | Goto et al. | 370/222 |
| 6,236,660 B1 | * | 5/2001 | Heuer | 370/409 |
| 6,256,292 B1 | * | 7/2001 | Ellis et al. | 370/227 |
| 6,480,502 B1 | * | 11/2002 | Abadi et al. | 370/432 |

FOREIGN PATENT DOCUMENTS

| | | | | |
|---|---|---|---|---|
| EP | 1041 760 A1 | * | 10/2000 | H04J/3/06 |
| EP | 1079 560 A2 | * | 2/2001 | H04J/3/07 |
| EP | 1083 690 A1 | * | 3/2001 | H04J/3/14 |
| GB | 2 286 745 A | | 8/1995 | |
| WO | WO 97/01907 | | 1/1997 | |

\* cited by examiner

Primary Examiner—Ken Vanderpuye
(74) Attorney, Agent, or Firm—Kirschstein, et al.

(57) ABSTRACT

A synchronous digital hierarchy (SDH) telecommunications system for transporting traffic with control bytes for indicating the sources of the traffic. The system comprises a plurality of interconnected nodes each capable of identifying undeliverable traffic by checking the sources indicated by the control bytes. The system also comprises a network management system (NMS) arranged to provide each node with information concerning the expected sources of the traffic. The system acts to identify undeliverable traffic by comparing the sources indicated by the control bytes with the expected sources.

15 Claims, 4 Drawing Sheets

| b1 | b2 | b3 | b4 | b5 | b6 | b7 | b8 |
|----|----|----|----|----|----|----|----|
| IEC | | | | TC-REI | OEI | TC-APId, TC-RDI, ODI, reserved | |

Figure 5

| Frame # | Bits 7 and 8 definition |
|---------|-------------------------|
| 1-8 | Frame Alignment Signal: 1111 1111 1111 1110 |
| 9-12 | TC-APId byte #1 [1 $C_1$ $C_2$ $C_3$ $C_4$ $C_5$ $C_6$ $C_7$] |
| 13-16 | TC-APId byte #2 [ 0 X X X X X X X ] |
| 17-20 | TC-APId byte #3 [ 0 X X X X X X X ] |
| : | : |
| : | : |
| : | : |
| 65-68 | TC-APId byte #15 [ 0 X X X X X X X ] |
| 69-72 | TC-APId byte #16 [ 0 X X X X X X X ] |
| 73-76 | TC-RDI, ODI and Reserved |

Figure 6

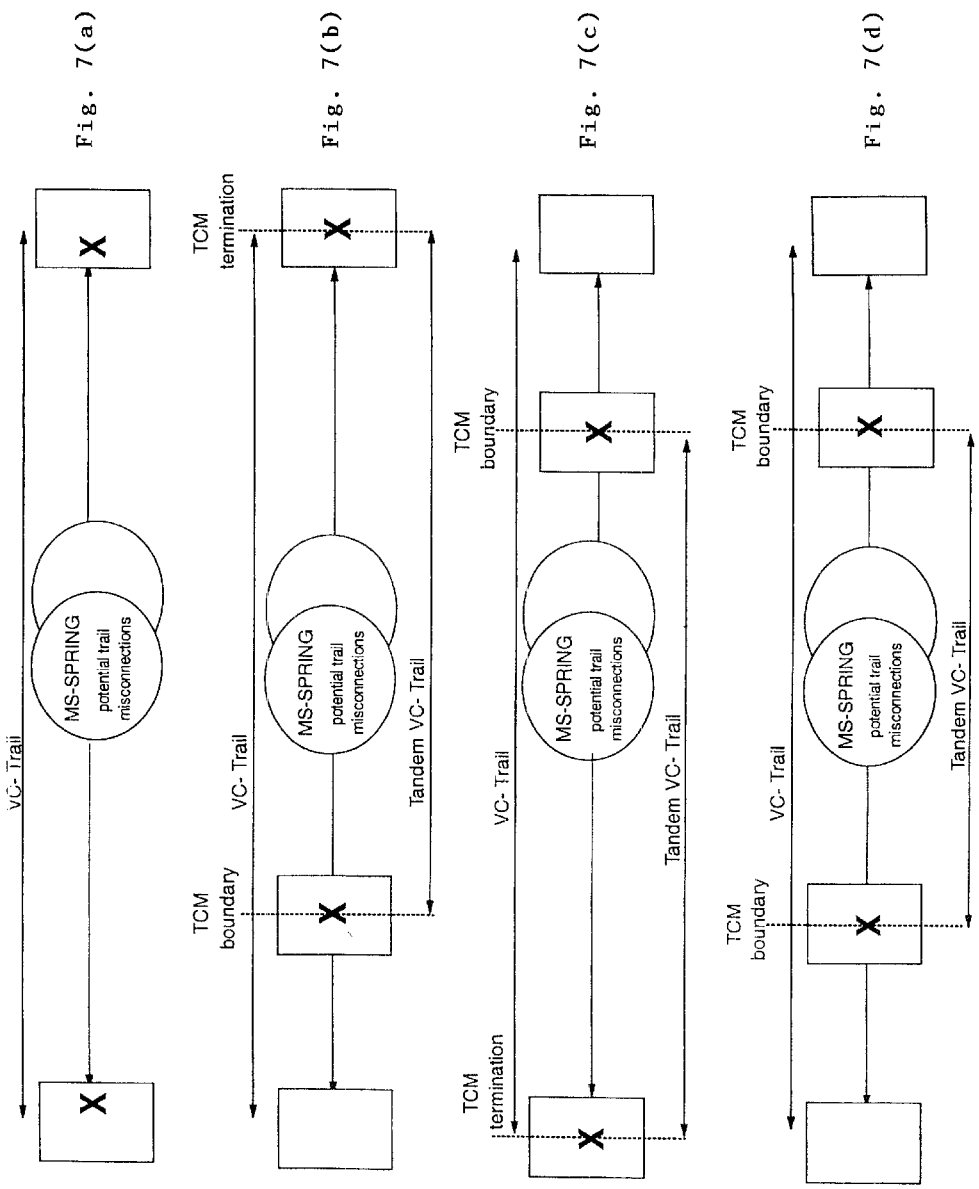

TELECOMMUNICATIONS SYSTEM

BACKGROUND OF THE INVENTION

The present invention relates to the field of telecommunications systems in general and synchronous digital hierarchy (SDH) networks in particular.

Telecommunications operators commonly arrange network elements (NE) or nodes such as telephone exchanges into ring topology networks in which each node is connected to its immediate neighbours by either two or four fibres. An example of such a ring network is a ring where a multiplex section shared protection is deployed (MS-SPRING). Such networks need to allow for the possibility of equipment failure: either node failure or failure of a span between two adjacent nodes. In order to cater for such failures, the spans commonly comprise working channels for carrying normal traffic plus additional, so-called protection channels which allow for the re-routing of traffic in the event of a failure. These protection channels may be unused normally or carry extra traffic which can be discarded in the event of a failure. Routing of traffic via a protection channel in order to avoid a failure point in a ring is known as protection switching.

One problem with protection switching is what to do with traffic which can no longer be delivered to the correct destination due to such a failure. This can occur if the destination node has failed or if a number of spans have failed rendering the destination node out of reach of the rest of the network. A destination node which has failed or which is isolated from the rest of the network due to failure in one or more spans is said to be invalid. Traffic that is destined for an invalid node is said to be undeliverable. There is a danger that such undeliverable traffic may be misdirected and end up at the wrong destination. This could have serious consequences, particularly if confidential information were to fall into the wrong hands as a result. There is therefore a need to delete undeliverable traffic. The deletion of undeliverable traffic is called squelching.

In order to provide squelching a method is needed to enable undeliverable traffic to be identified. A proposed method for dealing with undeliverable traffic in MS-SPRING is described in ITU-T Standard G.841. MS-SPRING provides for the identification of undeliverable traffic by having a so-called node map at each node of the ring. The node map would contain information on the traffic passing through the corresponding node: its origin, destination and whether it is to be dropped in that node or to be passed through.

A problem with the use of node maps is that they place a considerable burden on the telecommunications operator who has to generate and maintain complex tables of traffic information. A second problem is that MS-SPRING as currently defined does not support low order virtual container (LOVC) access. A further and important disadvantage of MS-SPRING is that it does not support timeslot interchange (TSI). This places a severe limitation on operators and raises a question as to the practicality of using MS-SPRING in a commercial network.

SUMMARY OF THE INVENTION

The use of the present invention allows the above problems to be addressed and in particular allows the above problem of undeliverable traffic to be addressed without the disadvantages of node maps.

The present invention provides a synchronous, digital hierarchy (SDH) telecommunications system for the transport of traffic, said traffic comprising control bytes for indicating the sources of the traffic, said system comprising a plurality of interconnected nodes, the nodes arranged for the identification of undeliverable traffic by checking the indications of the sources.

Preferably the SDH telecommunications system also comprises a network management system (NMS) in which the NMS is arranged to provide each node with information concerning the expected sources of the traffic, in which the system is arranged to identify undeliverable traffic by means of a comparison of the sources indicated by the control bytes with the expected sources, In a preferred embodiment the plurality of interconnected nodes comprise a multiplex section shared protection ring (MS-SPRING).

Each node may comprise a plurality of pieces of transmission equipment, each piece equipment may comprise a plurality of ports.

An example of a control byte is an overhead byte such as SDH path overhead (POH).

BRIEF DESCRIPTION OF THE DRAWINGS

An embodiment of the present invention will now be described by way of example with reference to the drawings in which:

FIG. 5 shows the format of the N1 byte in the TCM protocol of the prior art;

FIG. 6 shows the format of a TCM data message of the prior art;

FIG. 7(a) shows a communications system according to the present invention relating to a single-operator network in which checking is only carried out in the end nodes;

FIGS. 7(b) and (c) show a communications system according to the present invention relating to a multi-operator network comprising a TCM boundary node in which checking occurs at the TCM boundary and at one end node;

FIG. 7(d) shows a communications system according to the present invention relating to a multi-operator network comprising two TCM boundary nodes in which checking takes place at both boundary nodes.

DETAILED DESCRIPTION OF THE PREFERRED EMBODIMENTS

According to this embodiment, the invention is applied to a multiplex section shared protection ring (MS-SPRING) network. The MS-SPRING may have two or, as an alternative, four fibres (although the invention is equally applicable to networks with more than four fibres). Two-fibre MS switched rings (see FIG. 1) require only two fibres for each span of the ring. Each fibre carries both working channels and protection channels. On each fibre, half the channels are defined as working channels and half are defined as protection channels. The normal traffic carried on working channels in one fibre are protected by the protection channels travelling in the opposite direction around the ring.

Figure 2:
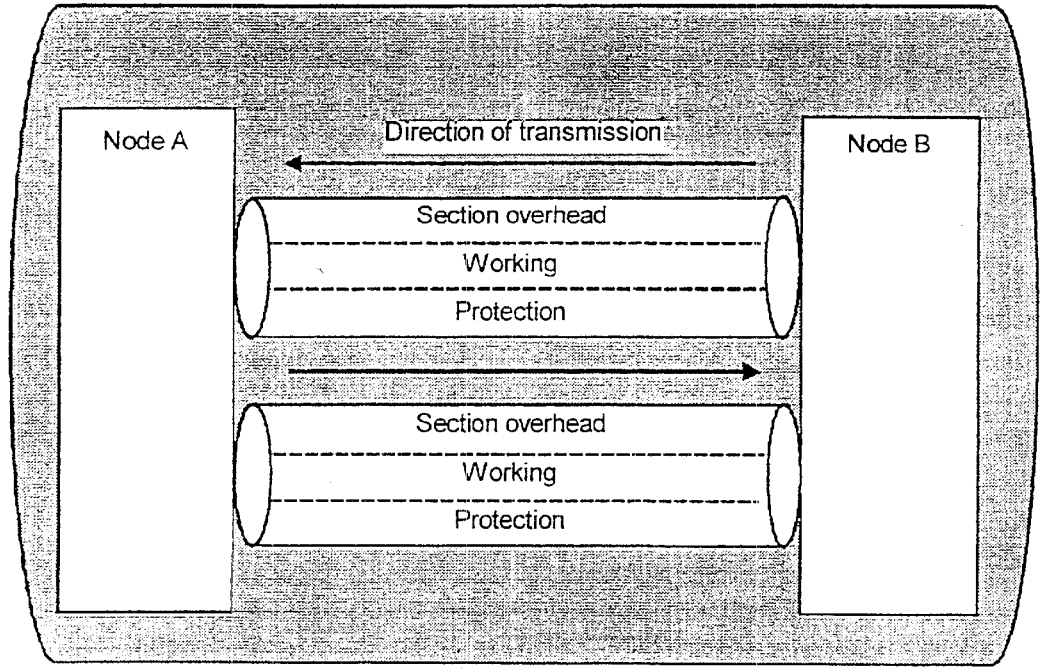
FIG. 2 shows a span of the network of FIG. 1 in more detail.

This permits the bidirectional transport of normal traffic. Only one set of overhead channels is used on each fibre. In FIG. 2 a two-fibre span is shown in more detail: each fibre shown carrying normal (working) traffic together with protection traffic between two nodes, each fibre carrying traffic in a different direction.

Four-fibre MS-SPRING (see FIG. 3) requires four fibres for each span of the ring. In FIG. 4 a four-fibre span between two nodes is shown in more detail. As illustrated in FIG. 4, working and protection channels are carried over different fibres: two multiplex sections transmitting in opposite directions carry the working channels while two multiplex sections, also transmitting in opposite directions, carry the protection channels. This permits the bidirectional transport of normal traffic. The multiplex section overhead is dedicated to either working or protection channels since working and protection channels are not transported over the same fibres.

Figure 1:
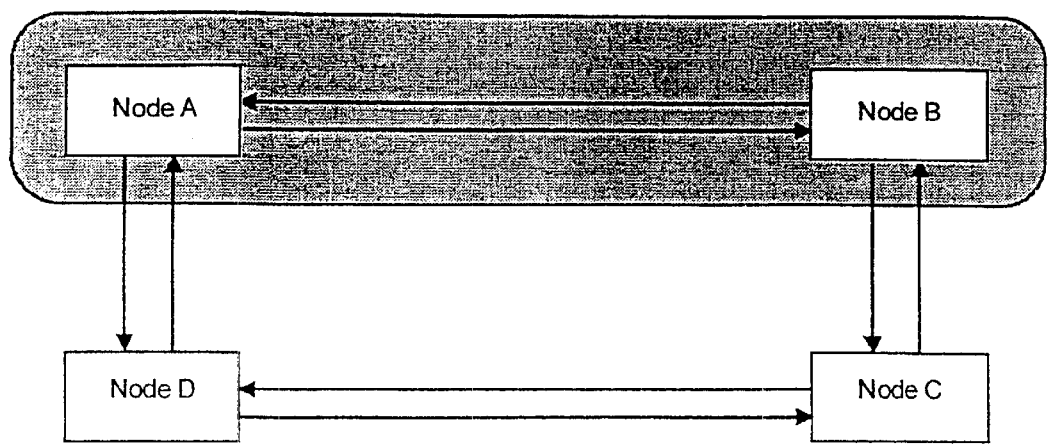
FIG. 1 shows in block diagram form a two-fibre ring network of the prior art.
Figure 3:
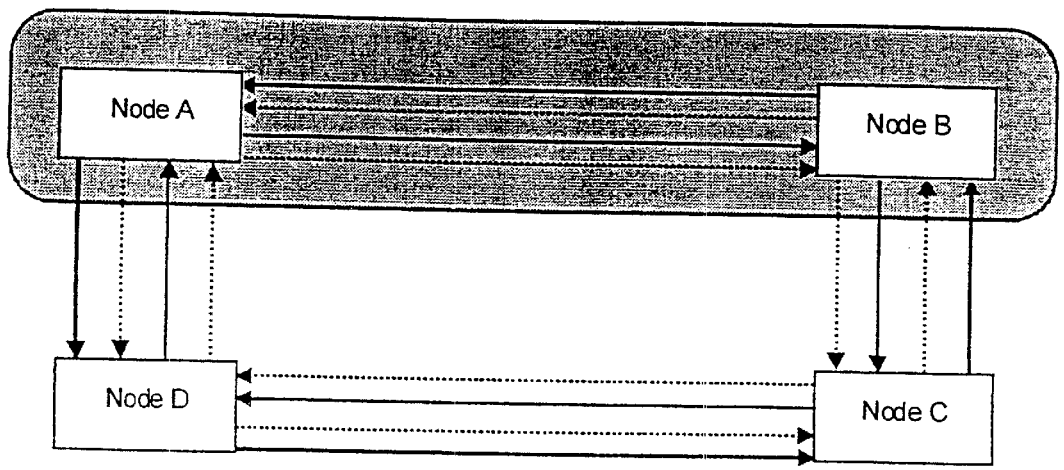
FIG. 3 shows in block diagram form a four-fibre ring network of the prior art.
Figure 4:
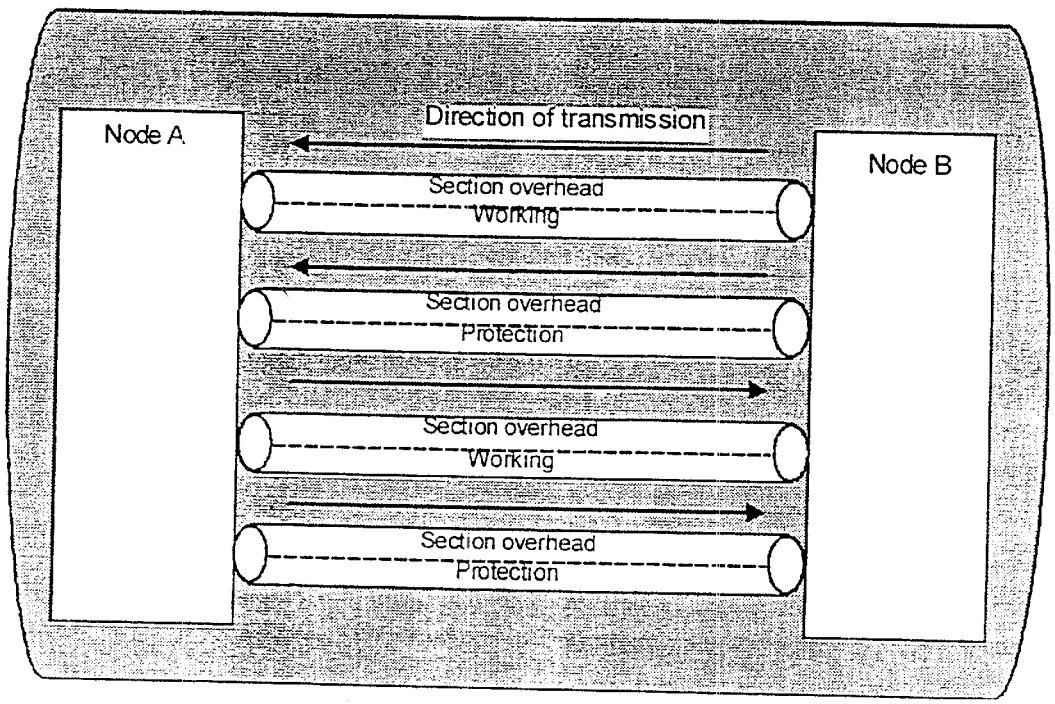
FIG. 4 shows a span of the network of FIG. 3 in more detail.

In FIGS. 1 and 3 each arrow represents a fibre, the arrow head indicating the direction of traffic flow along the fibre. In FIG. 3 arrows with dotted lines indicate fibres used for protection switching.

According to this embodiment of the invention undeliverable traffic is identified in the MS-SPRING by means of Tandem Connection monitoring. Tandem connection monitoring (TCM) is a concept discussed in ITU-T standard G.707 for allowing the performance of a segment of the traffic path in an SDH telecommunications network to be monitored. For example, as shown in FIGS. 7(b), (c) and (d), where traffic passes through a number of different operator networks: each operator could use TCM to verify the performance of path segments carrying that traffic across their own network. This is in contrast to end-to-end monitoring as shown in FIG. 7(a) only in relation to a single operator network. TCM uses overhead bytes N1 and N2 in the SDH frame to transport the TCM functionality.

A Tandem Connection is defined as a group of Higher Order VC(HOVC)-ns which are transported and maintained together through one or more tandem line systems, with the constituent HOVC payload capacities unaltered. In support of the layered overhead approach used in SDH, the Tandem Connection sub-layer falls between the Multiplex Section and path overhead layers (i.e. the functional overhead layering evolves to Regenerator Section, Multiplex Section, Tandem Connection and Path Layers).

The N1 byte in the path overhead in each HOVC of the Tandem Connection is defined as Tandem Connection Overhead (TCOH). N1 is allocated for Tandem Connection Monitoring for the VC-4 and VC-3 levels. As shown in FIG. 5, bits 1–4 of this byte in each HOVC of the Tandem Connection are used to provide a Tandem Connection Incoming Error Count (IEC). Bit 5 operates as the TC-Remote Error Indication (TC-REI) of the Tandem Connection to indicate errored blocks caused within the Tandem Connection. Bit 6 operates as the Outgoing.Error Indication (OEI) to indicate errored blocks of the egressing VC-n. Bits 7–8 operate in a 76 multiframe used to provide an end to end data link.

Bits 7–8 are used to provide:
the TC Access Point Identifier (TC-APId);
the TC-Remote Defect Indication (TC-RDI), indicating to the far end that defects have been detected within the Tandem Connection at the near end Tandem Connection sink.
the Outgoing Defect Indication (ODI), indicating to the far end that Administrative/Tributary Unit Alarm Indication Signal (AU/TU-AIS) has been inserted into the egressing AU-n/TU-n at the Tandem Connection sink due to defects before or within the Tandem Connection.
reserved capacity (for future standardisation)

The structure of the multiframe is given in FIG. 6.

If no valid AU-n/TU-n enters the Tandem Connection at the Tandem Connection source then a valid pointer is inserted. This results in a VC-AIS signal being inserted; the IEC is set to "incoming AIS" code. If a valid AU-n/TU-n enters the Tandem Connection, then an even Bit Interleaved Parity-8 (BIP-8) is computed for each bit n of every byte of the VC-n in the preceding frame including B3 and compared with byte B3 recovered from the current frames to determine the number of BIP violations arriving at the Tandem Connection source. This value is coded into bits 1 to 4.

In both cases bits 4–8 are assembled and transmitted according to FIGS. 5 and 6. The bits TC-REI, TC-RDI, OEI, ODI are set to "1" if the corresponding anomaly or defect is detected at the associated Tandem Connection sink of the reverse of direction. Since the BIP-8 parity check is taken over the VC-n (including N1), writing into N1 at the Tandem Connection source or sink will affect the VC-4/VC-3 path parity calculation. Because the BIP-8 parity should always be consistent with the current state of the VC-n the BIP has to be compensated each time N1 byte is modified. Since the BIP-8 value in a given frame reflects the parity check over the previous frame, the changes made to BIP-8 bits in the previous frame shall also be considered in the compensation of BIP-8 in the current frame.

If an unequipped or supervisory unequipped signal enters a Tandem Connection, then the N1 and B3 bytes are overwritten with values not equal to all zeroes.

A valid AU-n/TU-n at the Tandem Connection sink means that the N1 byte is monitored. The multiframe in bits 7 and 8 is recovered and the contents are interpreted. If the multiframe cannot be found, the TC-RDI and ODI bits are set to "1" in the reverse direction and AU/TU-AIS is inserted in the egressing AU-n/TU-n. The TC-APId is recovered and compared with the expected TC-APId. In the case of a mismatch, the TC-RDI and ODI bits are set to "1" in the reverse direction and AU/TU-AIS is inserted in the egressing AU-n/TU-n.

An "incoming AIS"-code indicates that a defect has already occurred before the Tandem Connection. In this case only the ODI-bit is set to "1" in the reverse direction and AU/TU-AIS is inserted in the egressing AU-n/TU-n.

The even BIP-8 parity is computed for each bit n of every byte of the VC-n in the preceding frame including B3 and compared with byte B3 recovered from the current frames to determine the number of BIP violations. The OEI bit is set to "1" in the reverse direction if the number of determined BIP-violations is greater than zero. Furthermore this value is compared with the number of BIP-violations retrieved from the IEC of the current frame. If the difference is not equal to zero an errored block caused within the Tandem Connection is declared and a TC-REI bit is signalled in the reverse direction.

If AU/TU-AIS is not inserted by the Tandem Connection sink, the N1 byte is set to all zeroes and the BIP is compensated as described above.

The element which originates/terminates the Tandem Connection is referred to as the Tandem Connection Terminating Element (TCTE). A Multiplex Section terminating element (MSTE) or a path terminating (PTE) may also be a TCTE.

In an alternative embodiment the above description relating to HOVC-ns also applies to Tandem Connections defined as a group of Low order VC (LOVC)-ns with the N2 byte being used in place of the N1 byte.

The second part of the arrangement is the provision to each individual node, transmission equipment and each individual port on each piece of transmission equipment of information as to the expected path trace (i.e. indication of the source) of traffic received. This source information is provided to each node by the relevant network management system, typically when a new path is set up. The checking of the source information contained in the overhead control bytes may be carried out at a number of levels as follows:

At the basic level the source may be checked only at the node where the traffic enters at TCM domain (referred to as the ingress node) and at the node at which the path leaves a TCM domain (known as the egress node). Typically the ingress and egress nodes will be situated at the points at the message path enters and leaves a particular operator's network respectively. However, it is also feasible to implement a more thorough checking regime in which, in addition to the ingress and egress nodes, the checking of the source indication is carried out at some or all of the intermediate nodes, i.e. those nodes along the path between the ingress node and the egress node in a particular TCM domain. Alternatively, checking at intermediate nodes may be used instead of checking at the ingress and egress nodes. In the extreme case protection could still be afforded by checking only at the ultimate node on a path, i.e. where the traffic is dropped for delivery to the recipient.

Each node will have plurality of ports and each port may provide access for a single path or a plurality of paths. The arrangement of the invention can cope with both eventualities as each incoming path, whether it has a dedicated port or shares a port with many others is provided with a unique identifier which allows it to be associated in the node with the relevant source identification.

Where undeliverable traffic is detected by a node it is squelched, i.e. the content of the undeliverable VC is set to all ones.

The present invention has been described with reference to TCM protocol option 2 (as designated in ITU-T G.707) however it will obvious to the skilled person in the field that the invention may also be applied to TCM protocol option 1 (as identified in that standard).

The invention equally applies to networks consisting of SDH paths in which traffic may become undeliverable due to failures in the network, the networks having topologies other than rings. The invention is also applicable to other forms of path trace, for example main path trace, i.e. covering the entire path rather than a segment.

The invention equally applies to conventional as well as partially or all optical networks, including networks based on a single fibre carrying a plurality of optical wavelengths: one or more optical wavelengths being used to carry working channels, other optical wavelengths within the same fibre used to carry protection channels.

What is claimed is:

1. A synchronous digital hierarchy (SDH) telecommunications system for the transport of traffic having control bytes for indicating sources of the traffic, said system comprising:

a plurality of interconnected nodes arranged for identifying undeliverable traffic by checking the sources indicated by the control bytes, and a network management system (NMS) arranged to provide each node with information concerning expected sources of the traffic, the system being arranged for identifying the undeliverable traffic by means of a comparison of the sources indicated by the control bytes with the expected sources.

2. The SDH telecommunications system of claim 1, the system being arranged to identify the undeliverable traffic according to a tandem connection monitoring (TCM) protocol.

3. The SDH telecommunications system of claim 2, in which the indications of the sources of the traffic are present in the TCM format.

4. The SDH telecommunications system of claim 2, in which the undeliverable traffic is identified by means of a TCM path trace.

5. The SDH telecommunications system of claim 4, in which the TCM path trace is defined in terms of high order virtual containers or low order virtual containers.

6. The SDH telecommunications system of claim 1, in which each node is arranged to squelch the traffic identified by that node as being undeliverable.

7. The SDH telecommunications system of claim 1, in which the nodes arranged for identifying the undeliverable traffic comprise ingress nodes and egress nodes.

8. The SDH telecommunications system of claim 1, in which the nodes arranged for identifying the undeliverable traffic comprise intermediate nodes.

9. The SDH telecommunications system of claim 1, in which the undeliverable traffic is identified by means of a main path trace.

10. The SDH telecommunications system of claim 1, in which each node comprises a number of ports for receipt of the traffic, and in which the identification of the undeliverable traffic is carried out at the port at which the traffic is received.

11. The SDH telecommunications system of claim 1, in which the control bytes are overhead bytes.

12. The SDH telecommunications system of claim 1, in which the control bytes are path overhead bytes.

13. The SDH telecommunications system of claim 1, in which the identification of the sources comprises identification of originating ports.

14. The SDH telecommunications system of claim 13, in which the originating ports are attached to the nodes, and in which the identification of the sources comprises identification of a location of the nodes to which the originating ports are attached.

15. The SDH telecommunications system of claim 1, in which the plurality of interconnected nodes comprises a multiplex section shared protection ring (MS-SPRING).

* * * * *